United States Patent [19]

Hofs

[11] 4,417,979
[45] Nov. 29, 1983

[54] PILE-UNLOADING DEVICE FOR PILED MOULDED ARTICLES

[75] Inventor: Bernardus T. Hofs, Holten, Netherlands

[73] Assignee: Machinefabriek Joh$^s$ Aberson B. V., Olst, Netherlands

[21] Appl. No.: 294,413

[22] Filed: Aug. 19, 1981

[30] Foreign Application Priority Data

Aug. 20, 1980 [NL] Netherlands ................... 8004714

[51] Int. Cl.$^3$ .............................................. B65G 47/90
[52] U.S. Cl. ..................................... 209/617; 414/118
[58] Field of Search ............ 209/580, 617, 581, 582, 209/587, 942, 516; 414/118, 120, 121, 122; 198/436, 418

[56] References Cited

U.S. PATENT DOCUMENTS

| | | | |
|---|---|---|---|
| 2,481,440 | 9/1949 | Page | 209/121 |
| 3,002,619 | 10/1961 | Marzolf | 209/121 |
| 3,670,906 | 6/1972 | Miller et al. | 214/6 P |
| 4,302,142 | 11/1981 | Kuhl et al. | 414/118 X |
| 4,355,936 | 10/1982 | Thomas | 414/118 |

FOREIGN PATENT DOCUMENTS 1239241 4/1967 Fed. Rep. of Germany .
2445185 12/1979 France .

Primary Examiner—Robert B. Reeves
Assistant Examiner—Donald Hajec
Attorney, Agent, or Firm—Quaintance & Murphy

[57] ABSTRACT

A pile-unloading device for moulded articles such as bricks, with pickers for each time grasping a layer of articles from the pile and depositing them onto a surface of e.g. a conveyor. Sets of pickers side by side move simultaneously, but are operable selectively individually or in groups to pick up articles from a depositing surface selectively. The articles not thus picked up are conveyed away, may be transferred to a faster conveyor to create distances between the articles and may be rotated in groups about a vertical axis. It is thus possible to grade or sort the articles according to quality, e.g. apparent from color differences.

7 Claims, 3 Drawing Figures

PILE-UNLOADING DEVICE FOR PILED MOULDED ARTICLES

This invention relates to a pile-unloading device for pilable moulded articles such as bricks, with grasping means to grasp moulded articles from the upper row of a pile and to displace them with respect thereto.

Such unloading devices are mainly intended to sort out and to make ready for shipment mouldings in the ceramic industry after baking or burning and by a mechanical procedure. This sorting is often necessary to sort a pile of burned moulded articles discharged from a furnace, such as bricks, into different qualities, a.o. and in particular depending on differences in hardness, in which the hardest moulded articles may e.g. be used as paving bricks for roads, while softer kinds may be used as masonry bricks of differing qualities.

With the present state of measuring and control engineering and with modern furnaces it is often possible to obtain a regular pattern for the different qualities in the entire charge of the furnace. For charges from reverberatory kilns there is usually both in horizontal and in vertical direction a difference in hardness of the bricks, whereas in charges for tunnelkilns the differences in quality occur essentially or exclusively in horizontal direction. If one may rely on a fixed pattern of qualities in the charge it is possible to adjust the pile-unloading device in a fixed adjustment adapted thereto. If this is not the case, it is necessary to determine each time for each pile which moulded articles therein belong to certain qualities and this is e.g. possible by a person looking at the articles and taking into account differences in colour, and the border lines between the articles of certain qualities may be indicated by chalk on the pile. Differences in hardness are in many cases shown by a difference in colour.

The present invention aims at providing a pile-unloading device which is adapted to unload a pile of moulded articles simply and rapidly with the least possible movements while separating as many different qualities as desired.

To this end a device as indicated in the preamble is according to the invention characterized in that, above supporting means for the pile, such as an elevator therefor, there are sets of grasping means one to the side of the other as seen in a plane substantially perpendicularly to the main vertical plane of the pile, said grasping means being connected to a common structure adapted to move said grasping means simultaneously in a substantially rectangular path in a vertical plane extending transversely to the main vertical plane of the pile, each set of grasping means comprising a multitude of grasping means one to the side of the other, as seen in a horizontal direction parallel to the pile, there being parts with take-up surfaces such as conveyors below said grasping means, movable substantially perpendicular to said vertical plane of movement of said grasping means, that the common structure to which the grasping means are connected is movable to move the grasping means in said vertical plane over a horizontal distance equal to the distance between the centres of two adjacent take-up surfaces and of two adjacent sets of grasping means and that at least those sets of grasping means, which do not take up a position right above the pile in part of their moving path, are operable separately in smaller numbers than the entire number in their set to take up moulded articles selectively from one take-up surface to put them onto an adjacent take-up surface.

In this way it is possible for the grasping means to move only over a short distance, while after discharging moulded articles onto a take-up surface other grasping means may grasp a part of these moulded articles in order to discharge them onto an other take-up surface for separating qualities. This may be repeated as often as desired, e.g. by the application of four take-up surfaces one to the side of the other, which requires four sets of grasping means.

The invention moreover relates to a further detailed realisation of this principle, with means to process moulded articles present with their longitudinal direction in the plane of the pile and being present between moulded articles with their longitudinal direction perpendicular to the main surface of the pile, and with means to process other bodies than moulded articles in the pile, such as distance blocks (spacer blocks) during the unloading of the pile.

The invention will now be explained in more detail on the basis of a preferred embodiment shown in the attached drawings in which.

A pile 1 of baked bricks is moved from a kiln onto a lifting device 5. Most of the bricks in this pile have their longitudinal axis perpendicular to the main surface of the pile. In the pile there are distance of spacer blocks 2 keeping the piles correctly in place one to the side of the other in the kiln and which protrude somewhat to both sides of the pile. At 3 is shown how a part of the bricks may be positioned with the longitudinal axis in the plane of the pile and depending on the dimensions of the bricks there may be two or three bricks one to the side of the other making up the width of the pile. The pile rests on supporting bricks 4, between which openings remain to be able to convey the whole pile with a forktruck or the like, e.g. into the kiln or from the kiln onto the lifting device 5.

Figure 1:
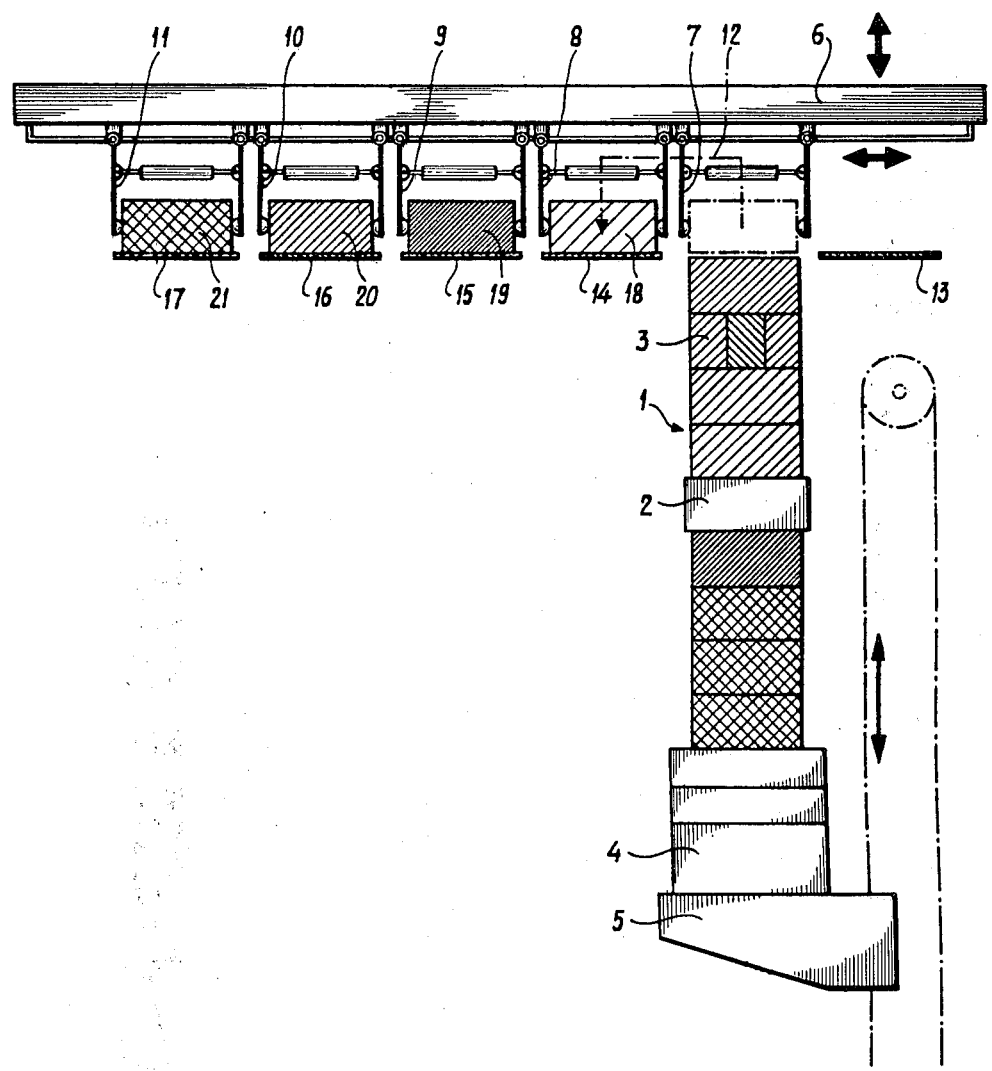
FIG. 1 is a diagrammatic view in a vertical plane of a device according to the invention.
Figure 2:
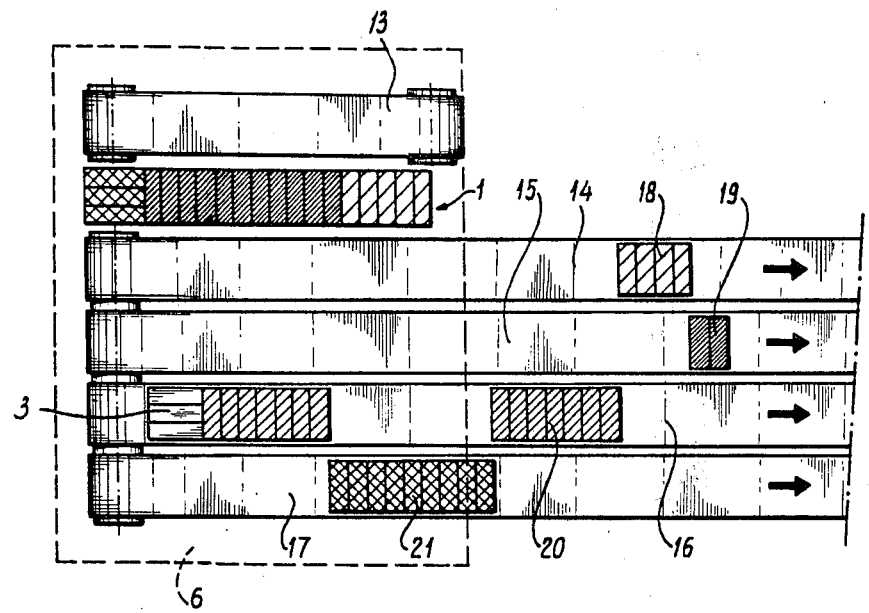
FIG. 2 is a view from above thereof, also diagrammatic.

Above the pile there is a frame 6 which is movable itself or has a movable frame, the means for moving this not being shown. The frame 6 is shown in dotted lines in FIG. 2 in order to give a better view of the parts below it. The movable frame carries at its under side sets 7 to 11 inclusive of grasping means, there being preferably one grasping means (two grasping levers, one to each side) over the horizontal width of one brick. Such grasping means as e.g. a set of two pivotable levers move towards and away from each other by a pneumatic cylinder or solenoid and if desired spring means therein between them as shown in FIG. 1 will below be called a picker. Preferably the picker for each separate brick is separately operable, but it is possible to make a smaller number of pickers of the same set 7 to 11 operable simultaneously. The pickers of set 8 may, however, be operable only simultaneously and the same may be true for the pickers of set 7. Each set of pickers has at least as many pickers as there are bricks in a layer of the pile, and preferably also some pickers more at the outer ends, in case the bricks in the layers of the pile have moved away from each other somewhat so that after the baking the pile is somewhat "open" and longer than shown in FIG. 2. Therefore, frame 6 is shown in FIG. 2 to be somewhat longer than the pile so as to protrude from the pile at both ends thereof, where the frame 6 has a few additional pickers.

The pickers may be opened and closed as is known as such to liberate a brick or to grasp a brick. For the pickers 8 the path laid back with the frame 6 is shown by dot-and dash-line 12 and all pickers together will always make a similar movement with the frame 6 or with the frame by which they are carried and which is movable with respect to frame 6.

To the side of the pile there are take-up conveyors 13 to 17 inclusive.

The operation of this device is as follows: after a pile of bricks has been positioned on the elevator 5 this is moved upwardly so far that the upper layer of bricks is at a level to allow the pickers 7 or 8 to grasp them and thereupon the pickers are moved with their frame so that the pickers 8 take up the upper layer of bricks and move them along the path 12 first upwardly, then to the left in FIG. 1 and then downwardly, after which the pickers open to discharge this layer of bricks onto the conveyor 14.

Thereupon the pile 1 is lifted by elevator 5 over the height of one layer of bricks until the next layer of bricks is within reach of the pickers. The above described grasping of the upper layer by the pickers 8 and the discharging thereof onto the the conveyor 14 is now repeated. As all the pickers move simultaneously, the pickers 9 have meanwhile reached a position to grasp the layer of bricks 18 deposited onto conveyor 14 when the pickers 8 are again above the pile 1. Now, if in the upper layer 18 of bricks there are two or more qualities of bricks, only those pickers 9 are operated to close and engage bricks in layer 18 which pick up bricks of all qualities except one predetermined quality, so that the bricks of one quality remain on conveyor 14 whereas all the bricks in layer 18 of one or more other qualities are moved to conveyor 15 and discharged thereon.

Before the pickers 8 bring a new complete upper layer of bricks from the pile onto conveyor 14, this conveyor is moved horizontally to the right in FIG. 2 and perpendicular to the plane of FIG. 1 so that the bricks 18, which remained thereon after pickers 9 have removed part of said bricks, are moved away by said conveyor so that they do not hinder the oncoming next layer of bricks.

If on conveyor 15 there are bricks 19 of more than one quality, the pickers 10, which each time end their movement to the right in FIG. 1 above conveyor 15, be operated selectively so that they take up all bricks from layer 19 except of one predetermined quality, which remain on conveyor 15 and those bricks of one or more other qualities are thus moved to conveyor 16. The same takes place by pickers 11 if more than one quality of bricks would be present on conveyor 16 and thus bricks 21 of the quality last sorted out are discharged onto conveyor 17.

It will be clear that in this way by simultaneous movement of all pickers 7 to 11 according to path 12 or a similar path to the side thereof each layer of the pile may be split up into the qualities present therein.

The pickers 7 move between the pile and the discharge conveyor 13. They are operated if in the concerning layer of the pile there is a spacer block such as 2. They take up such a block when in the position of FIG. 1, so that all the other pickers 8 to 11 are at a distance from the pile and when the frame 6 moves back to bring the pickers 8 above the pile, the pickers 7 bring such a block to conveyor 13 where they are opened to discharge it.

In this way processing is continued until the entire pile has been processed. The carrier blocks 4 may then be taken up e.g. by a forktruck and be conveyed to a piling device in order to be charged with green bricks and then be fed to a kiln.

By the short stroke of all the pickers in their movement and by the sorting method chosen it is possible to obtain a very high capacity of the device. It is thus even possible to process e.g. 18,000 bricks per hour, each cycle taking up only a few seconds.

The application of separate pickers per brick has the advantage that differences in length of the bricks, e.g. by differences in shrinking, do not have any disadvantageous effect on the grasping notwithstanding the fact that it is not necessary for the pickers to be provided with thick elastic pads or cushions as are known and necessary in other cases to give a good picking.

In the described system the conveyors 14 to 17 inclusive each time are moved when the pickers are moving in their path 12 etc. for transferring bricks. Between said periods, when bricks are to be discharged, the conveyors should be stationary. Conveyor 13 should only move when a spacer block has been discharged thereon to make room for a next spacer block.

Figure 3:
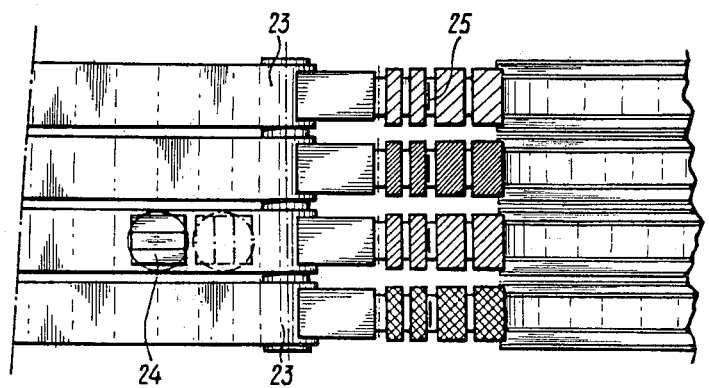
FIG. 3 is a view from above of a part of conveying device which may join the device of FIG. 2 at the right hand side thereof.

As appears from FIG. 2 there are finally groups of bricks of only one quality on one conveyor. Each conveyor brings said groups to an other conveyor 23 shown in FIG. 3 and moving at a higher speed so that the bricks when being taken over by conveyor 23 from conveyor 14 to 17 are given a mutual distance. This is known as such and so does not need further detailing. It is now possible, e.g. with a photo-electric sensor, reacting to light which is passed transversely over a concerning conveyor 23, to determine whether there are bricks on it having their longitudinal direction transverse to the longitudinal direction of the conveyor or whether there are bricks being with their longitudinal direction in the longitudinal direction of this conveyor, as indicated at 3 in FIG. 1. If it is thus determined that bricks pass which are so directed, a turning device may be operated, which may be of known design and may e.g. grasp the bricks from above and rotate them over 90°. One of them is diagrammatically shown at 24. It is important for this invention that such bricks may be unloaded from the pile without changing the position of their axis, they may then be conveyed further and only in a later stage, after generating more distance between the bricks longitudinally of the conveyor when transferring them from conveyor 14 to 17 to conveyor 23 they may be turned, so that such rotation is not hindered by adjacent bricks.

At 25 diagrammatically a tilting device has been indicated, which may put bricks standing on their small side to be laid down on their broader side. After this the bricks are transported further in the usual way, they may be piled up, made into packets or processed in other ways.

For a fixed pattern of quality distribution in the pile a fixed programming may be applied in such a way that always the same pickers of each set 7 to 11 inclusive are operated at the correct moment. It is in this case also possible to considerably limit the number of pickers so that each picker may take up a number of bricks and only this fixed program may be realized, but this gives difficulties when the quality distribution may differ even exceptionally. If the quality distribution normally changes or if it is desired to change the borders between the qualities by other requirements for the distribution of qualities, e.g. in view of varying requirements made by customers, it is preferable to have a flexible device in which it is easy to adapt the program to circumstances, although this means that part of the pickers for the conveyors farther away from the pile will not often be used. It is of course easily possible to feed the information about which pickers have to operate into a microprocessor device, with a normal key board and at a central panel. It would also be possible to feed the pattern of the quality distribution in the pile into a processor to have it determine itself which pickers have to become active. Further automation is possible by determining the quality differences on the basis of colour differences automatically with the aid of a light source, e.g. applying infrared reflection, and to feed this automatically into such a processor to have this processor determine which pickers should become active.

I claim:

1. A pile-unloading device for pileable moulded articles such as bricks, with grasping means to grasp moulded articles from the upper row of a pile and to displace them with respect thereto, characterized in that, above supporting means for the pile, there are sets of grasping means one to the side of the other as seen in a plane substantially perpendicularly to the main vertical plane of the pile, said grasping means being connected to a common structure adapted to move said grasping means simultaneously in a substantially rectangular path in a vertical plane extending transversely to the main vertical plane of the pile, each set of grasping means comprising a multitude of grasping means one to the side of the other, as seen in a horizontal direction parallel to the pile, there being parts with take-up surfaces below said grasping means, movable substantially perpendicular to said vertical plane of movement of said grasping means, that the common structure to which the grasping means are connected is movable to move the grasping means in said vertical plane over a horizontal distance equal to the distance between the centres of two adjacent take-up surfaces and of two adjacent sets of grasping means and that at least those sets of grasping means, which do not take up a position right above the pile in part of their moving path, are operable separately in smaller numbers than the entire number in their set to take up moulded articles selectively from one take-up surface to put them onto an adjacent take-up surface.

2. A device according to claim 1, with conveyors as take-up surfaces in which said conveyors are connected to more rapidly moving conveyors, which are provided with means to rotate moulded articles over 90° about a vertical axis.

3. A device according to claim 1 which also includes one or more grasping means to grasp other bodies than moulded articles in the pile, to discharge them at the side of the pile opposite to the side to which the moulded articles are moved by the grasping means.

4. A device according to claim 3 in which said grasping means for other bodies are carried by the same moving device for the other grasping means in order to move simultaneously therewith and in the same path.

5. A device according to claim 3 wherein the other bodies than moulded articles in the pile constitute spacer blocks.

6. A device according to claim 1 wherein the supporting means is an elevator for the pile.

7. A device according to claim 1 wherein the take-up surfaces are conveyors.

* * * * *